United States Patent
Tsunoda et al.

[19]

[11] Patent Number: 6,026,708
[45] Date of Patent: Feb. 22, 2000

[54] SYSTEM FOR OUTPUTTING POWER FROM A CRANKSHAFT

[75] Inventors: Masaki Tsunoda; Koji Koishikawa, both of Wako, Japan

[73] Assignee: Honda Giken Kogyo Kabushiki Kaisha, Tokyo, Japan

[21] Appl. No.: 09/141,317

[22] Filed: Aug. 27, 1998

Related U.S. Application Data

[62] Division of application No. 08/534,451, Sep. 27, 1995, Pat. No. 5,826,464.

[30] Foreign Application Priority Data

Sep. 27, 1994 [JP] Japan .................................... 6-231157
Sep. 29, 1994 [JP] Japan .................................... 6-235618

[51] Int. Cl.[7] .............................. G05G 1/00; G05G 1/12
[52] U.S. Cl. ................................ 74/572; 403/258; 60/330
[58] Field of Search ............................ 74/15.63, 15.6, 74/572, 573 R, 573 F, 574; 403/257, 258; 60/330

[56] References Cited

U.S. PATENT DOCUMENTS

| | | | |
|---|---|---|---|
| 212,257 | 2/1879 | Norris, Jr. | 74/15.63 X |
| 1,653,341 | 12/1927 | Chilton | 403/158 |
| 2,961,892 | 11/1960 | Spannhake | 74/574 |
| 3,242,765 | 3/1966 | Zahn | 74/572 |
| 3,845,622 | 11/1974 | Hufstader | 74/573 R |
| 4,254,668 | 3/1981 | Kessinger et al. | 74/572 |
| 4,262,552 | 4/1981 | Honda | 74/572 |
| 4,411,237 | 10/1983 | Ableitner et al. | 123/501 |
| 4,520,688 | 6/1985 | Ban | 74/572 |
| 4,751,993 | 6/1988 | Fukushima | 74/572 X |
| 4,997,408 | 3/1991 | Copeland | 464/98 |
| 5,058,027 | 10/1991 | Becraft | 364/468 |
| 5,852,931 | 12/1998 | Reichenmiller et al. | 60/339 |

FOREIGN PATENT DOCUMENTS

| | | |
|---|---|---|
| 58-120831 | 8/1983 | Japan . |
| 63-138107 | 6/1988 | Japan . |
| 3-21509 | 3/1991 | Japan . |

*Primary Examiner*—David M. Fenstermacher
*Attorney, Agent, or Firm*—Nikaido Marmelstein Murray & Oram LLP

[57] ABSTRACT

A flange portion formed on an inner periphery of a flywheel is fitted to an end of a crankshaft. A spline piece is fitted to an inner peripheral surface of the flywheel. The flange portion of the flywheel and a flange portion of the spline piece are commonly fastened to the end of the crankshaft by bolts. An upper end of a driving shaft is spline-fitted at a point into a driving shaft coupled portion of the spline piece which is accommodated in an internal hole in the crankshaft. Thus, in coaxially coupling the flywheel and the driving shaft to the end of the crankshaft, it is possible to make such a coupled area compact and to reduce vibration by an accurate centering thereof.

2 Claims, 9 Drawing Sheets

FIG. 9

SYSTEM FOR OUTPUTTING POWER FROM A CRANKSHAFT

This application is a divisional application of application Ser. No. 08/534,451 filed Sep. 27, 1995, now U.S. Pat. No. 5,826,464.

BACKGROUND OF THE INVENTION

1. Field of the Invention

The present invention relates to a system for outputting power from a crankshaft, including a flywheel and a spline piece which are coaxially coupled to an end of a crankshaft to permit power to be output through the spline piece.

2. Description of the Prior Art

A power output system is conventionally known from Japanese Patent Application Laid-open No. 138107/88, in which a common engine for a boat is commonly used in an inboard engine system including a crankshaft disposed horizontally and in an outboard engine system including a crankshaft disposed vertically.

A power output system is also conventionally known from Japanese Utility Model Application Laid-open No.21509/91, which includes a flywheel and a transmission shaft coupled to a lower end of a crankshaft which is disposed vertically.

If power is output from an end of the crankshaft at which the flywheel is mounted, as in one embodiment of Japanese Patent Application Laid-open No. 138107/88, or as in Japanese Utility Model Application Laid-open No. 21509/91, a problem of a torsional vibration to a power output shaft (corresponding to an end of the crankshaft in the prior art, and the spline piece in the present invention) by the flywheel is reduced, which is convenient as a measure to counter vibration.

Further, a power output system is conventionally known from Japanese Utility Model Application Laid-open No.120831/83, which includes a spline piece mounted at a lower end of a crankshaft which is opposite from a flywheel, so that power is output.

In the power output system described in Japanese Patent Application Laid-open No.138107/88, the direction of outputting power from the crankshaft is different when the crankshaft is disposed horizontally and when the crankshaft is disposed vertically and for this reason, it is necessary to adjust the rotational direction in a driven side which receives power from the engine. In the power output system described in Japanese Utility Model Application Laid-open No.21509/91, a transmission is integrally incorporated immediately below the flywheel and hence, in its intact condition without modification, the mountability of the power output system to another industrial machine is poor and is poor in general purpose properties, and any technique for coupling another equipment in place of the transmission is not disclosed at all. In the system described in Japanese Utility Model Application Laid-open No. 120831/83, the flywheel is mounted on the opposite side from the spline piece, which is inconvenient for preventing vibration.

SUMMARY OF THE INVENTION

Accordingly, it is an object of the present invention to provide a measure to counter a torsional vibration by a flywheel having a large inertial mass in outputting power from an end of a crankshaft by using a spline piece, and to provide an accurate centering and a compactification of the spline piece.

To achieve the above object, according to a first embodiment of the present invention, there is provided a system for outputting power from a crankshaft, comprising a flywheel and a spline piece which are coaxially coupled to an end of a crankshaft to permit power to be output through the spline piece. One side of the flywheel is fitted to an outer periphery of an end of the crankshaft. The spline piece has a flange portion superposed on the other side of the flywheel. The spline piece is fitted to an inner peripheral surface of the flywheel and has a spline-coupling portion which extends from the flange portion toward the crankshaft and which is accommodated in an internal hole that opens into the end of the crankshaft. The system further includes a bolt for commonly fastening the flange portions of the flywheel and the spline piece to the end of the crankshaft.

With the above construction, the three members: the crankshaft, the flywheel and the spline piece can be axially and radially accurately positioned with a reduced number of components and hence, it is possible not only to prevent the generation of vibration due to eccentricity, but also to suppress the radial projection of the flange portion, connected to the spline-coupling portion of the spline piece, to a minimum to reduce the radial size. In addition, since the spline-coupling portion of the spline piece is accommodated in the internal hole in the crankshaft, it is also possible to reduce the axial size.

To achieve the above object, according to a second embodiment of the present invention, there is provided a system for outputting power from a crankshaft, comprising a flywheel and a spline piece which are coaxially coupled to an end of a crankshaft to permit power to be output through the spline piece. One side of the flywheel is fitted to an outer periphery of an end of the crankshaft. The spline piece has a flange portion superposed on the other side of the flywheel. A spline-coupling portion extends from the flange portion toward the crankshaft and is accommodated in an internal hole that opens into the end of the crankshaft. The system further includes a bolt for commonly fastening the flange portions of the flywheel and the spline piece to the end of the crankshaft.

With the above construction, the three members: the crankshaft, the flywheel and the spline piece can be axially and radially accurately positioned with a reduced number of components and hence, it is possible not only to prevent the generation of vibration due to eccentricity, but also to suppress the radial projection of the flange portion, connected to the spline-coupling portion of the spline piece, to a minimum to reduce the radial size. In addition, since the spline-coupling portion of the spline piece is accommodated in the internal hole in the crankshaft, it is also possible to reduce the axial size. Further, since the spline piece is coaxially positioned directly to the crankshaft without using the flywheel, the positioning accuracy of the spline piece is further enhanced.

Further, to achieve the above object, according to a third embodiment of the present invention, a system for outputting power from a crankshaft, comprises a flywheel and a spline piece which are coaxially coupled to an end of a crankshaft to permit power to be output through the spline piece. One side of the flywheel is fitted to an outer periphery of an end of the crankshaft. The spline piece has a flange portion superposed on the other side of the flywheel. The spline piece is fitted to an inner peripheral surface of the flywheel and has a spline-coupling portion which extends from the flange portion away from the crankshaft. The system further includes a bolt for commonly fastening the flange portions of the flywheel and the spline piece to the end of the crankshaft.

With the above construction, the three members: the crankshaft, the flywheel and the spline piece can be axially and radially accurately positioned with a reduced number of components and hence, it is possible to prevent the generation of vibration due to eccentricity. It is also possible to suppress the radial projection of the flange portion, connected to the spline-coupling portion of the spline piece, to a minimum to reduce the radial size.

The above and other objects, features and advantages of the invention will become apparent from the following description of preferred embodiments taken in conjunction with the accompanying drawings.

DESCRIPTION OF THE PREFERRED EMBODIMENTS

A first embodiment of the present invention will now be described with reference to FIGS. 1 to 4.

Figure 1:
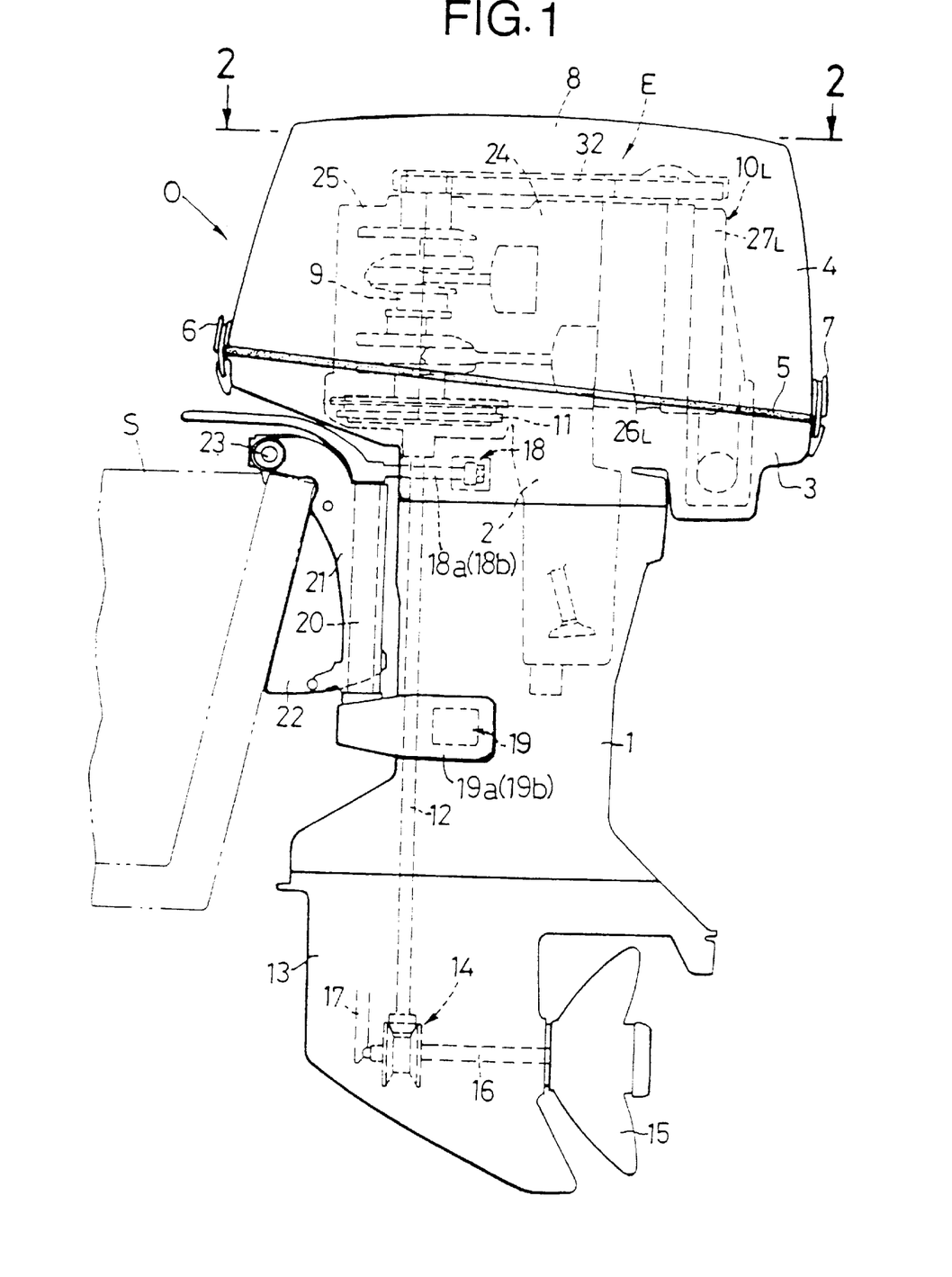
FIG. 1 is a side view of the entire outboard engine system incorporating a power output system according to a first embodiment of the present invention.
Figure 2:
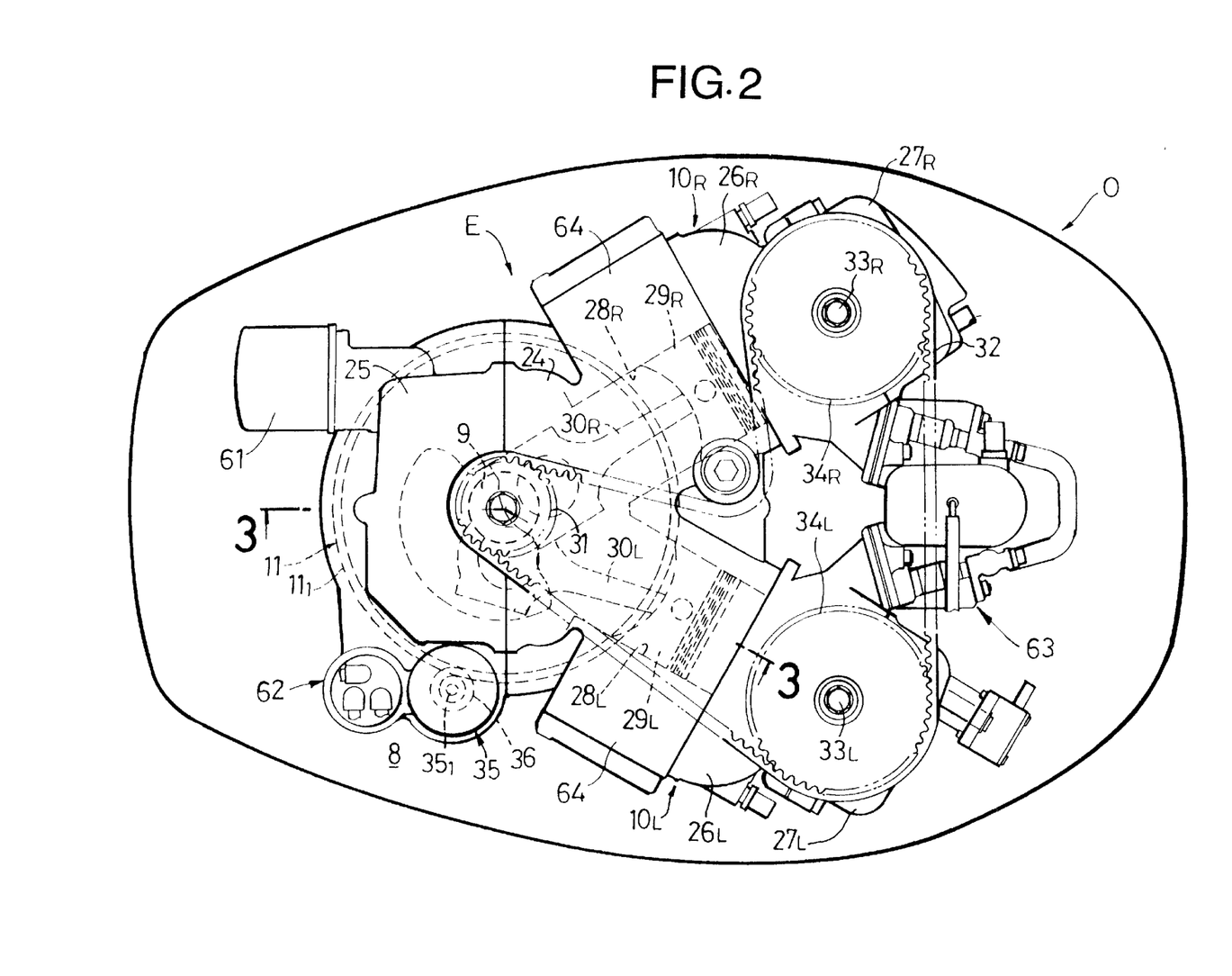
FIG. 2 is an enlarged sectional view taken along a line 2—2 in FIG. 1.

Referring to FIGS. 1 and 2, an outboard engine system O includes a mount case 2 for mounting and fixing a V-type 4-cylinder and 4-cycle engine E to an upper portion of an extension case 1 which is a frame. The engine E is supported on an upper surface of the mount case 2. An under-case 3 having an open upper surface is coupled to the mount case 2. An engine cover 4 is detachably mounted on an upper portion of the under-case 3. The engine cover 4 is coupled to an upper edge of the under-case 3 through a seal member 5 mounted at a lower edge of the engine cover 4. The engine cover 4 is fixed by a pair of front and rear grips 6 and 7. In a condition in which a crankshaft 9 is in a vertical attitude and a pair of banks $10_R$ and $10_L$ are spread rearwardly, the engine E is accommodated within an engine room 8 defined inside the engine cover 4.

A driving shaft 12 is connected to a lower end of the crankshaft 9 of the engine E along with a flywheel 11. The driving shaft 12 extends downwardly within the extension case 1. A lower end of the driving shaft 12 is connected to a propeller shaft 16 having a propeller 15 at its rear end, through a bevel gear mechanism 14 provided within a gear case 13. A lower end of a shifting member 17 is connected to a front portion of the bevel gear mechanism 14 in order to change the rotational direction of the propeller shaft 16.

A swivel shaft 20 is fixed between an upper mount 18 provided in the mount case 2 and a lower mount 19 provided in the extension case 1. The upper mount 18 includes a pair of arms or bolts 18a and 18b. The lower mount includes a pair of arms or bolts 19a and 19b. A swivel case 21, for rotatably supporting the swivel shaft 20, is vertically swingably supported on a stern bracket 22 mounted at a stern S through a tilting shaft 23.

The engine E includes a cylinder block 24 which is V-shaped as viewed in a plane, a crankcase 25 which defines a crank chamber by cooperation with the cylinder block 24, a pair of cylinder heads $26_R$ and $26_L$ coupled to a pair of deck faces of the cylinder block 24, and head covers $27_R$ and $27_L$ coupled to the cylinder head $526_R$ and $26_L$. Pistons $29_R$ and $29_L$ are slidably received in two left cylinders $28_L$ and two right cylinders $28_R$ which are defined in the cylinder block 24. These pistons $29_R$ and $29_L$ are connected to the crankshaft 9 through connecting rods $30_R$ and $30_L$.

The driving force of a crank pulley 31 mounted at an upper end of the crankshaft 9 is transmitted through an endless belt 32 to a cam pulley $34_L$ mounted on a cam shaft $33_L$ in the left bank $10_L$ and a cam pulley $34_R$ mounted on a cam shaft $33_R$ in the right bank $10_R$.

The flywheel 11 secured to a lower end of the crankshaft 9 includes a gear $11_1$, provided on its outer periphery, and a pinion 36 is provided on an output shaft $35_1$, of a starter motor 35 and meshed with the gear $11_1$.

In FIG. 2, reference numeral 61 is a cartridge-type oil filter mounted in the crankcase 25. Reference numeral 62 is a magnetic switch portion of the starter motor. Reference numeral 63 is a fuel injection device including a nozzle mounted in the intake manifold inside the V-bank. Reference numeral 64 is an exhaust passage provided in the cylinder block 24.

Figure 3:
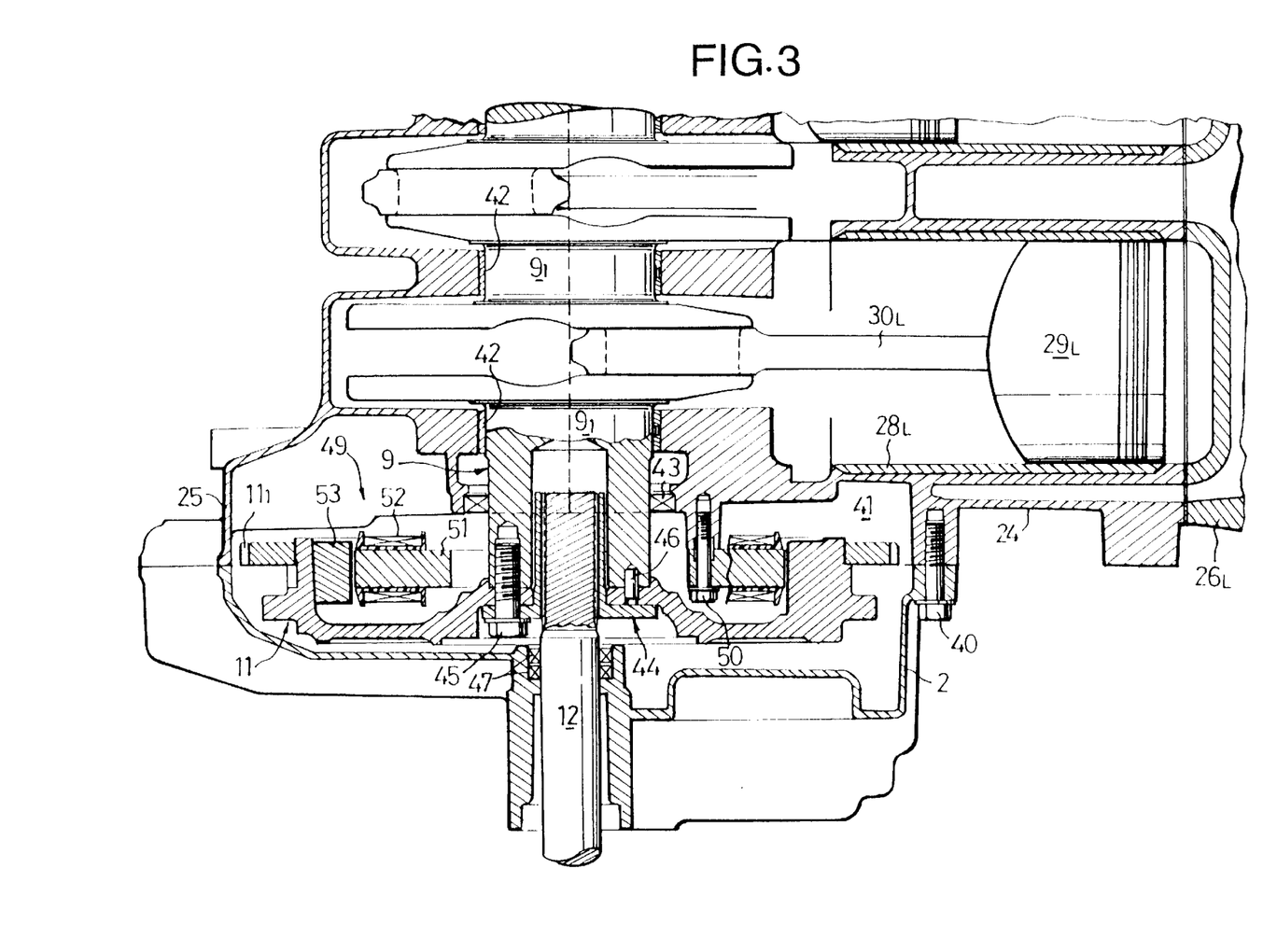
FIG. 3 is a sectional view taken along a line 3—3 in FIG. 2.

As can be seen from FIG.3, the mount case 2 coupled to the lower surface of the cylinder block 24 and the crankcase 25 by a bolt 40 defines a flywheel accommodating chamber 41 which accommodates the flywheel 11. The crankshaft 9 vertically disposed is supported at its journal portions $9_1$ on metal bearings 42 mounted between the cylinder block 24 and the crankcase 25. The lower end of the crankshaft 9 is passed through a seal member 43 into the flywheel accommodating chamber 41. Another partition member may be provided between the mount case 2 and the cylinder block 24, and the flywheel accommodating chamber 41 may be defined between the partition member and the mount case 2.

The flywheel 11 and a spline piece 44 are commonly fastened to the lower end of the crankshaft 9, for example, by three bolts 45 (only one is shown in FIG. 3), and the crankshaft 9 and the flywheel 11 are positioned in a direction of rotation of a knock pin 46. An upper end of the driving shaft 12, extending through seal members, 47 into the flywheel accommodating chamber 41, is spline-fitted into the spline piece 44.

In the embodiment, each of the driving shaft 12, the crankshaft 9 and the spline piece 44 is made from a carbon steel, and the flywheel 11 is made from a gray cast iron.

A power generator 49 is mounted in the flywheel accommodating chamber 41 and includes a stator core 51 fixed to a lower surface of the cylinder block 24 by bolts 50, a coil 52 wound around an outer periphery of the stator core 51, and a permanent magnet 53 fixed to an inner periphery of the flywheel 11 serving as a rotor.

Figure 4:
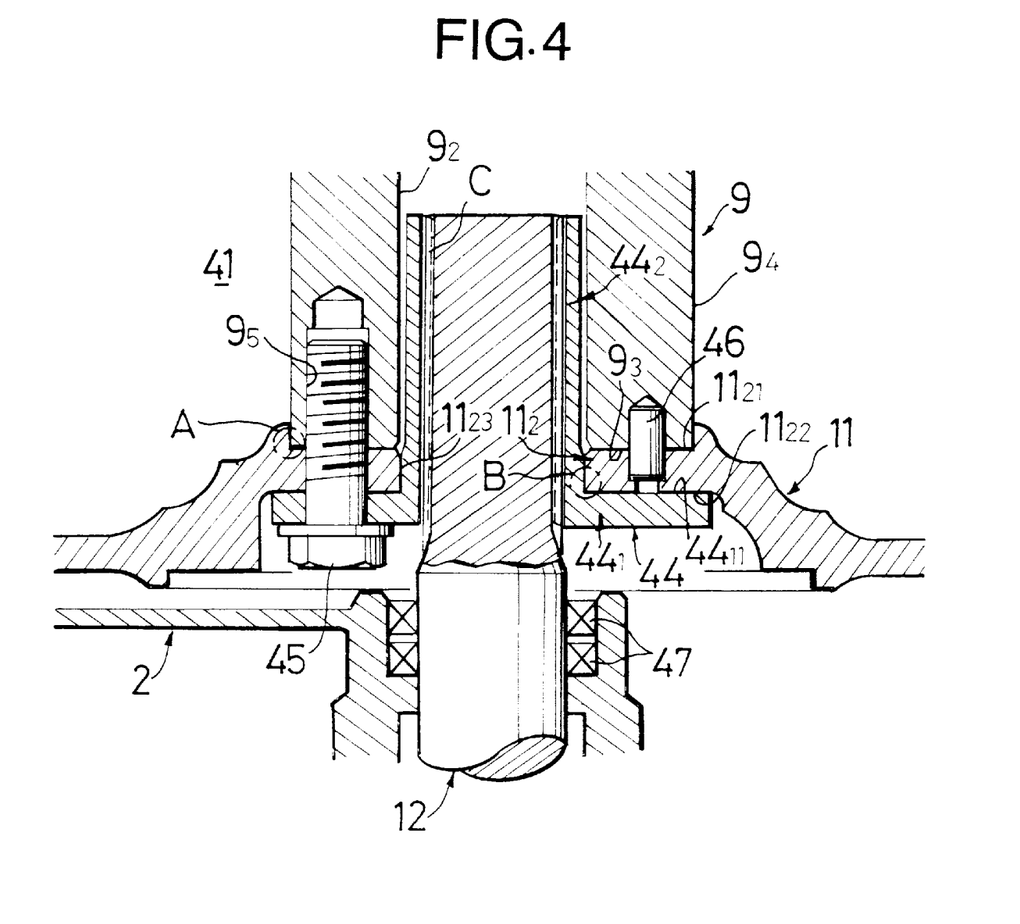
FIG. 4 is an enlarged view of an essential portion shown in FIG. 3.

The structure of coupling of the crankshaft 9, the flywheel 11, the spline piece 44 and the driving shaft 12 will be described below in detail with reference to FIG. 4.

An upper surface $11_{21}$ of a flange portion $11_2$ centrally formed on the flywheel 11 is butted against the lower end face $9_3$ of the crankshaft 9 into which an internal hole $9_2$ axially opens. At that time, the flange portion $11_2$ of the flywheel 11 is fitted (at A) to an outer peripheral surface $9_4$ of the crankshaft 9, so that the crankshaft 9 and the flywheel 11 are coaxially positioned.

The spline piece 44 includes a flange portion $44_1$, and a driving shaft-coupled portion $44_2$, and an upper surface $44_{11}$, of the flange portion $44_1$ is butted against a lower surface $11_{22}$ of the flange portion $11_2$ of the flywheel 11. At that time, the spline piece 44 is fitted (at B) to an inner peripheral surface $11_{23}$ of the flange portion $11_2$ of the flywheel 11, so that the flywheel 11 and spline piece 44 are coaxially positioned.

In this manner, the three members: the crankshaft 9, the flywheel 11 and the spline piece 44 are coaxially positioned by fitting at two points A and B, and the three members are integrally commonly fastened by threadedly inserting the bolts 45, passed from below, through the flange portion $44_1$ of the spline piece 44 and the flange portion $11_2$ of the flywheel 11 into bolt bores $9_5$ in the crankshaft 9.

The upper end of the driving shaft 12 is coaxially spline-fitted (at C) into the driving shaft-coupled portion $44_2$ of the spline piece 44 loosely fitted in the internal hole $9_2$ in the crankshaft 9.

Thus the rotation of the crankshaft 9 of the engine E is transmitted through the flywheel 11 and the spline piece 44 to the driving shaft 12 and then from the latter through the bevel gear mechanism 14 and the propeller shaft 16 to the propeller 15.

As described above, the driving force of the engine E is output from the side of the flywheel 11 having a large inertial mass to the driving shaft 12 and therefore, the torsional strength of the crankshaft 9 is conveniently increased and thus, it is possible to suppress the generation of vibration to a minimum. In addition, since the three members: the crankshaft 9, the flywheel 11 and the spline piece 44 are coaxially positioned by the fitting at the two points A and B, it is possible to prevent the generation of vibration due to eccentricity of the three members. Moreover, since the three members are commonly fastened by the common bolts 45, the number of components is decreased.

In the prior art, after the flywheel is initially bolted to the crankshaft, the spline piece is bolted at its outer peripheral position. In contrast, in the system according to the present invention, the projection of the flange portion $44_1$ of the spline piece 44 is suppressed to a minimum by the common fastening of the three members by the common bolts 45, thereby achieving a reduction in size of the power output area, leading to enhanced general-purpose properties.

Further, since the spline piece 44 is fitted at B by utilizing the inner peripheral surface $11_{23}$ required in processing the flywheel, it is unnecessary to define a special hole for fitting of the spline piece 44 to the flywheel 11, leading to a decreased number of processing steps. Since the driving shaft-coupled portion $44_2$ of the spline piece 44 is accommodated in the internal hole $9_2$ in the crankshaft 9, it is possible not only to reduce the axial size of the power output area, but also to minimize the radial projection of the flange portion $44_1$ connected to the driving shaft-coupled portion $44_2$ to reduce the radial size of the power output area.

Figure 5:
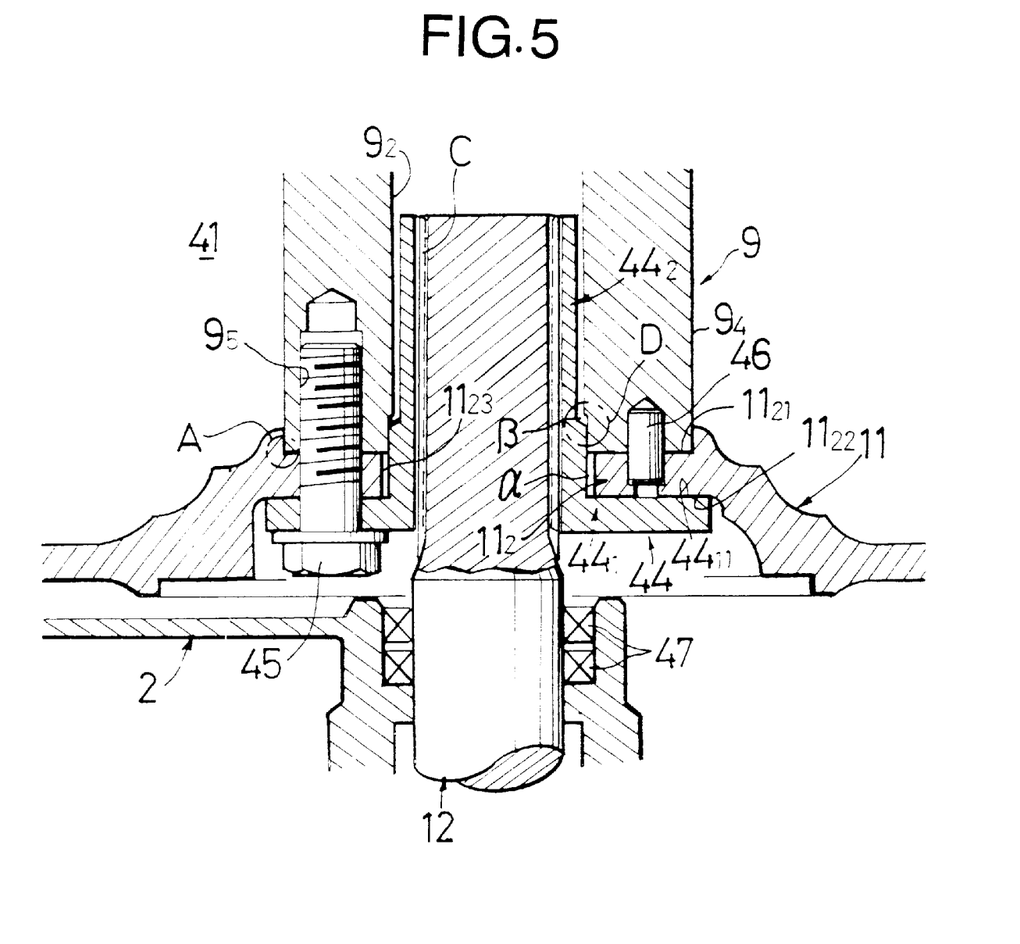
FIG. 5 is a view similar to FIG. 4, but illustrating a second embodiment of the present invention.

A second embodiment of the present invention will now be described with reference to FIG. 5.

Although the spline piece 44 has been coaxially positioned to the flywheel 11 by the fitting at B in the previously-described first embodiment, the spline piece 44 is coaxially positioned directly to the crankshaft 9 in the second embodiment. More specifically, the outer periphery of the driving shaft-coupled portion 442 of the spline piece 44 is not in direct contact with the inner peripheral surface 1123 of the flywheel 11, and a radial gap $\alpha 0$ is provided therebetween. The outer periphery of the driving shaft-coupled portion $44_2$ of the spline piece 44 is fitted at D into the internal hole $9_2$ in the crankshaft 9 and coaxially positioned to the crankshaft 9.

In the second embodiment, an operational effect similar to that in the first embodiment can be provided, and in addition, the spline piece 44 can be coaxially positioned directly to the crankshaft 9 without using the flywheel 11, and axes of the crankshaft 9 and the spline piece 44 can be further accurately aligned with each other.

The spline piece 44 is axially positioned with its flange portion $44_1$ abutting against the flange portion $11_2$ of the flywheel 11 and therefore, the fitting D of the driving shaft-coupled portion $44_2$ of the spline piece 44 and the crankshaft 9 may be such that there is an axial gap $\beta$ therebetween. Further, the driving shaft-coupled portion $44_2$ of the spline piece 44 may be only simply fitted into the internal hole $9_2$ in the crankshaft 9. In short, the driving shaft-coupled portion $44_2$ of the flywheel 44 needs only to be radially positioned relative to the internal hole $9_2$ in the crankshaft 9 and thus, the processing cost for the internal hole $9_2$ in the crankshaft 9 can be reduced.

A third embodiment of the present invention will now be described with reference to FIGS. 6 to 8, wherein members or components corresponding to those in the first and second embodiments are designated by like reference numerals.

Figure 6:
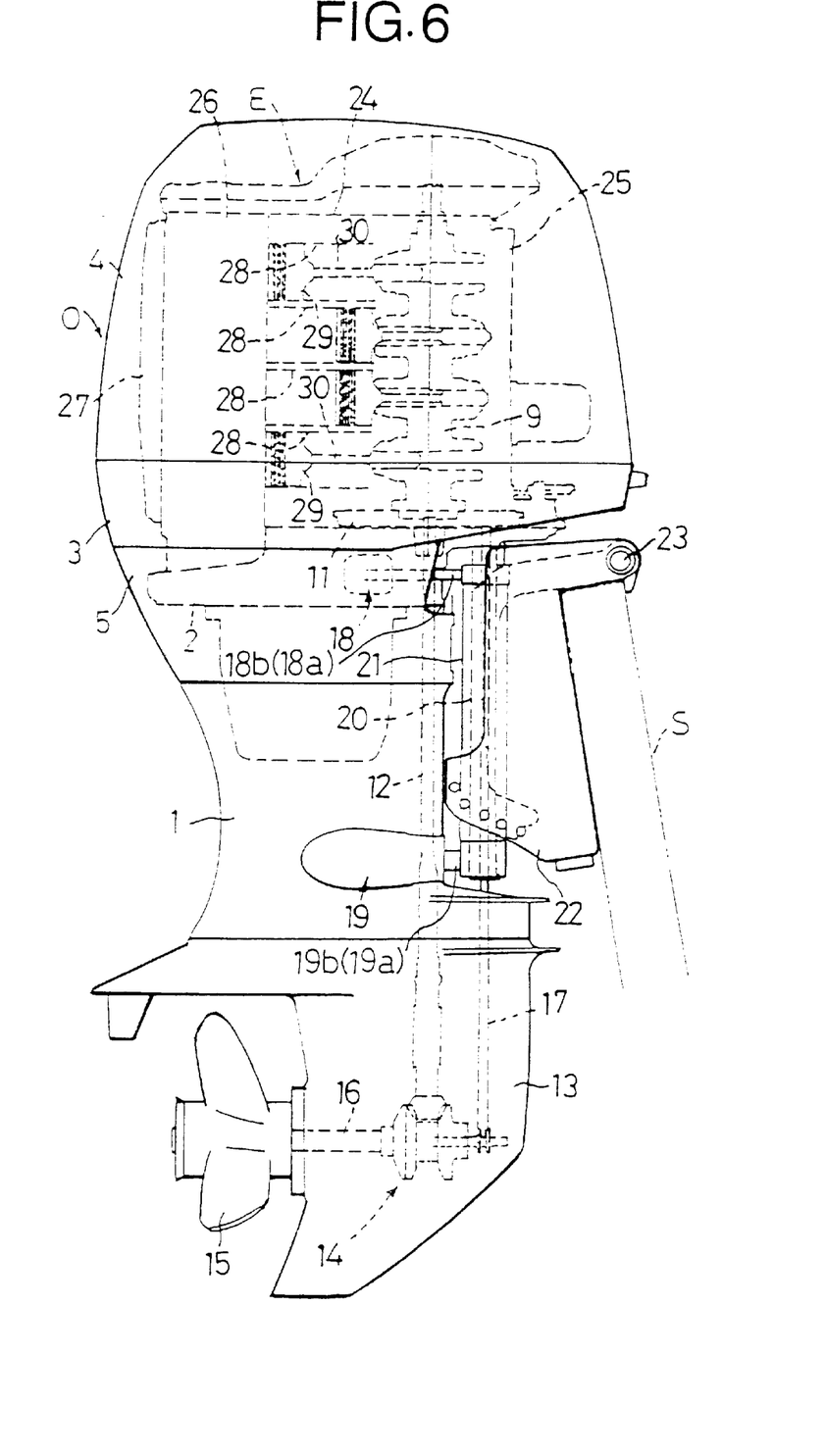
FIG. 6 is a side view of the entire outboard engine system incorporating a power output system according to a third embodiment of the present invention.

As shown in FIG. 6, an outboard engine system O includes a mount case 2 coupled to an upper portion of an extension case 1. A serial 4-cylinder and 4-cycle engine E is supported on an upper surface of the mount case 2. An under-case 3 having an open upper surface is coupled to the mount case 2. An engine cover 4 is detachably mounted to an upper portion of the under-case 3. A lower edge of the engine cover 4 is coupled to an upper edge of the under-case 3. An under-cover 5 is coupled between a lower edge of the under-case 3 and an upper edge of the extension case 1. Thus, in a condition in which a crankshaft 9 is in a vertical attitude, the engine E is accommodated within an engine room which is defined inside the engine cover 4.

A driving shaft 12 is connected to a lower end of the crankshaft 9 of the engine E along with a flywheel 11. The driving shaft 12 extends downwardly within the extension case 1. The driving shaft 12 is connected at its lower end through a bevel gear mechanism 14 mounted within a gear case 13 to a propeller shaft 16 having a propeller 15 at its rear end. A lower end of a shifting member 17 is connected to a front portion of the bevel gear mechanism 14 in order to change the direction of rotation of the propeller shaft 16.

A swivel shaft 20 is fixed between an upper mount 18 provided in the mount case 2 and a lower mount 19 provided in the extension case 1. A swivel case 21, for rotatably supporting the swivel shaft 20, is vertically swingably supported through a tilting shaft 23 on a stern bracket 22 mounted at a stern S.

The engine E includes a cylinder block 24, a crankcase 25 which defines a crank chamber by cooperation with the cylinder block 24, a cylinder head 26 coupled to a deck face of the cylinder block, and a head cover 27 coupled to the cylinder head 26. Pistons are slidably received in four cylinders 28 defined in the cylinder block 24, respectively, and are connected to the crankshaft 9 through connecting rods 30.

Figure 7:
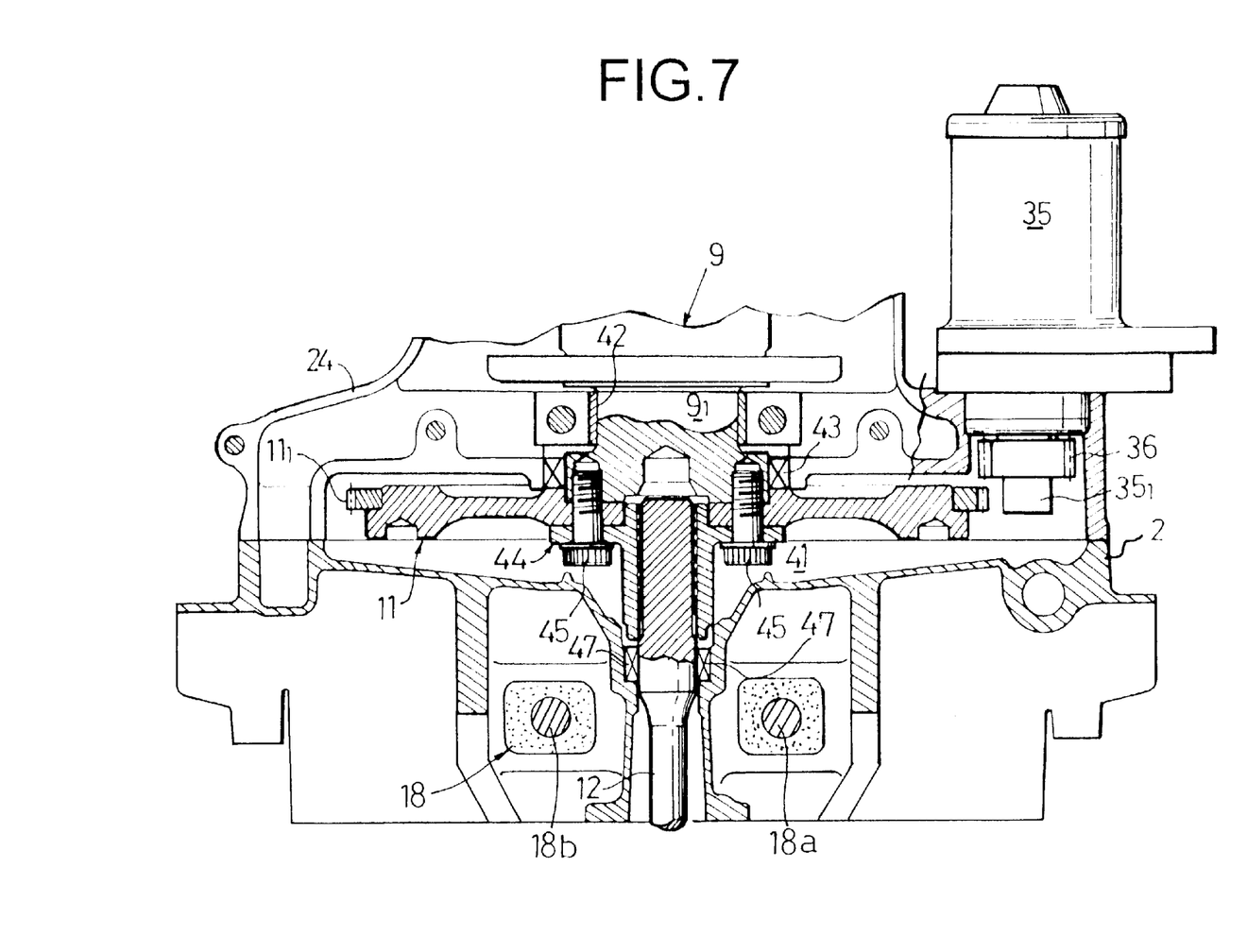
FIG. 7 is an enlarged sectional view of an essential portion shown in FIG. 6.
Figure 8:
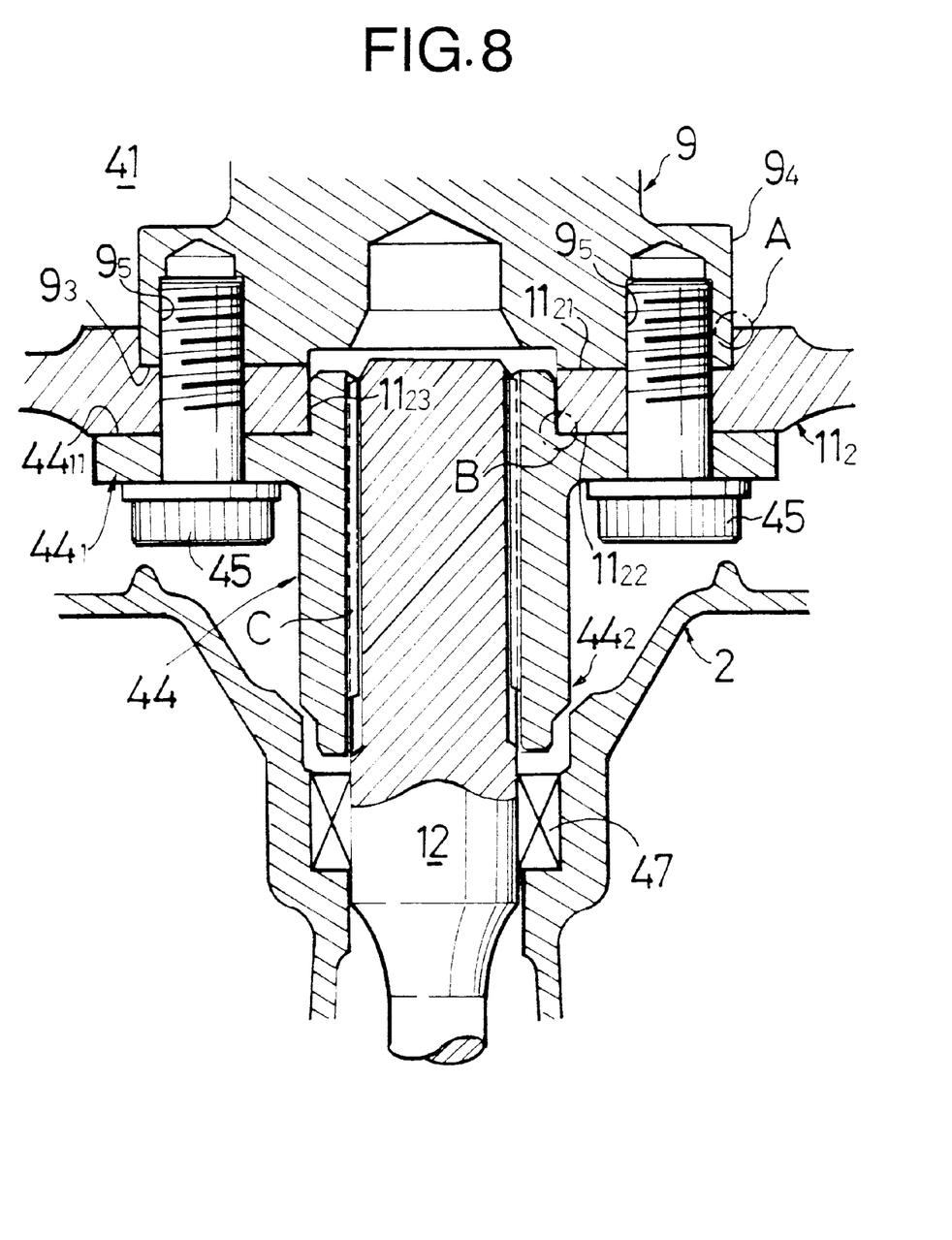
FIG. 8 is an enlarged view of an essential portion shown in FIG. 7.

As can be seen from FIG.7, the mount case 2, coupled to lower surfaces of the cylinder block 24 and the crankcase 25, defines a flywheel accommodating chamber 41 which accommodates the flywheel 11 therein. Journal portions $9_1$ of the crankshaft 9, disposed vertically, are supported on metal bearings 42 which are mounted between the cylinder block 24 and the crankcase 25, and a lower end of the crankshaft 9 is passed through a seal member 43 into the flywheel accommodating chamber 41. The flywheel 11, secured to the lower end of the crankshaft 9, includes a gear $11_1$ around an outer periphery thereof. A pinion 36, provided on an output shaft $35_1$ of starter motor 35, is meshed with the gear $11_1$.

The flywheel 11 and the spline piece 44 are commonly fastened to a lower end of the crankshaft 9, for example, by three bolts 45 (only two are shown in FIG.7). An upper end of the driving shaft 12, extending through a seal member 47 into the flywheel accommodating chamber 41, is spline-fitted into the spline piece 44.

The structure of coupling of the crankshaft 9, the flywheel 11, the spline piece 44 and the driving shaft 12 will be described below in detail with reference to FIG. 8.

An upper surface (or first side) $11_{21}$ of a flange portion $11_2$ centrally formed on the flywheel 11 is butted against a lower end face $9_3$ of the crankshaft 9. At that time, the flange portion $11_2$ of the flywheel 11 is fitted (at A) to an outer peripheral surface $9_4$ of the crankshaft 9, so that the crankshaft 9 and the flywheel 11 are coaxially positioned.

The spline piece 44 includes a flange portion $44_1$ and a driving shaft-coupled portion $44_2$, and an upper surface $44_{11}$, of the flange portion $44_1$ is butted against a lower surface (or second side) $11_{22}$ of the flange portion $11_2$ of the flywheel 11. At that time, the spline piece 44 is fitted (at B) to an inner peripheral surface $11_{23}$ of the flange portion $11_2$ of the flywheel 11, so that the flywheel 11 and spline piece 44 are coaxially positioned.

In this manner, the three members: the crankshaft 9, the flywheel 11 and the spline piece 44 are coaxially positioned by fitting at two points A and B, and the three members are integrally commonly fastened by threadedly inserting the bolts 45, passed from below, through the flange portion $44_1$ of the spline piece 44 and the flange portion $11_2$ of the flywheel 11 into bolt bores $9_5$ in the crankshaft 9.

The driving shaft-coupled portion $44_2$ of the spline piece 44 extending from the flange portion $44_1$ in a direction away from the crankshaft 9 is cylindrically formed. An outer periphery of the driving shaft 12 at its upper end is coaxially spline-fitted (at C) to an inner periphery of the driving shaft-coupled portion (or spline coupling portion) $4_2$.

In this embodiment, the flywheel 11 is made of a gray cast iron, and each of the crankshaft 9, the driving shaft 12 and the spline piece 44 is made of a carbon steel.

Thus, the rotation of the crankshaft 9 of the engine E is transmitted through the flywheel 11 and the spline piece 44 to the driving shaft 12 and then from the latter through the bevel gear mechanism 14 and the propeller shaft 16 to the propeller 15.

As described above, the driving force of the engine E is output from the side of the flywheel 11 having a large inertial mass to the driving shaft 12 and therefore, the torsional strength of the crankshaft 9 is conveniently increased and thus, it is possible to suppress the generation of vibration to a minimum. In addition, since the three members: the crankshaft 9, the flywheel 11 and the spline piece 44 are coaxially positioned by the fitting at the two points A and B, it is possible to prevent the generation of vibration due to eccentricity of the three members. Moreover, since the three members are commonly fastened by the common bolts 45, the number of components is decreased.

In the prior art, after the flywheel is initially bolted to the crankshaft, the spline piece is bolted at its outer peripheral position. In contrast, in the system according to the present invention, the projection of the flange portion 44 of the spline piece 44 is suppressed to a minimum by the common fastening of the three members by the common bolts 45, thereby achieving a reduction in size of the power output area, leading to enhanced general-purpose properties.

Further, since the spline piece 44 is fitted at B by utilizing the inner peripheral surface $11_{23}$ required in processing the flywheel, it is unnecessary to define a special hole for fitting of the spline piece 44 to the flywheel 11, leading to a decreased number of processing steps. Since the upper end of the driving shaft-coupled portion $44_2$ is fitted to the inner peripheral surface $11_{23}$ of the flywheel 11, it is possible to ensure the spline length of the driving shaft-coupled portion $44_2$ without an increase in vertical size.

Figure 9:
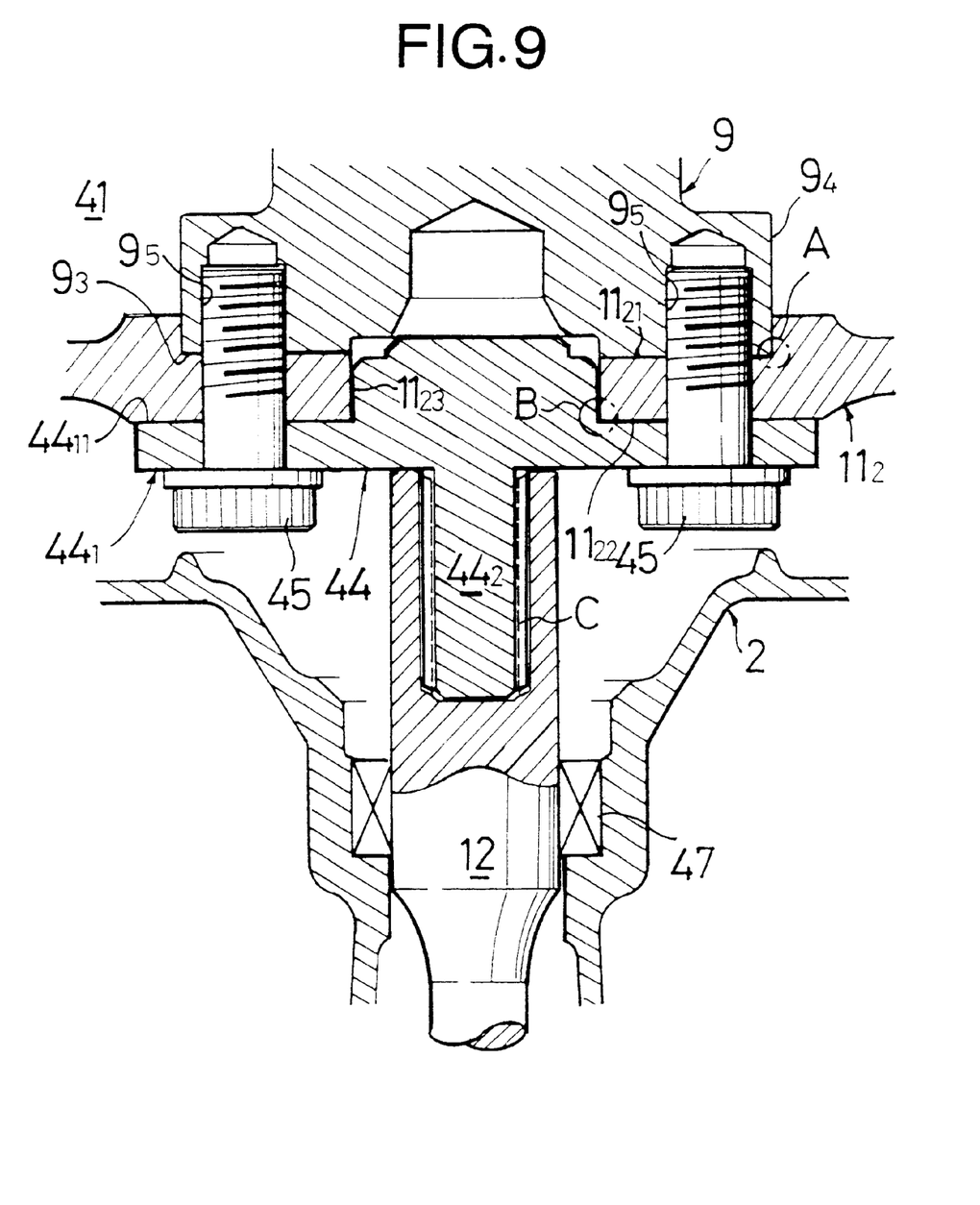
FIG. 9 is a view similar to FIG. 8, but illustrating a fourth embodiment of the present invention.

A fourth embodiment of the present invention will now be described with reference to FIG. 9.

Although the driving shaft-coupled portion $44_2$ of the spline piece 44 has been cylindrically formed, and the driving shaft 12 is spline-fitted to the inner periphery of the driving shaft-coupled portion $44_2$ in the third embodiment, the driving shaft-coupled portion 44 of the spline piece 44 is formed into a rod-like shape, and the driving shaft 12 is spline-fitted at C to the outer periphery of the driving shaft-coupled portion $44_2$ in the fourth embodiment.

In the fourth embodiment, an operational effect similar to that in the third embodiment can be provided. However, the spline length of the driving shaft-coupled portion 442 is slightly shorter than that in the third embodiment.

Although the embodiments of the present invention have been described in detail, it will be understood that the present invention is not limited to the above-described embodiments, and various modifications in design may be made without departing from the spirit and scope of the invention defined in claims.

For example, the output of power from the crankshaft of the engine in the outboard engine system has been illustrated in the embodiments, but the present invention is also applicable to the output of power from a crankshaft of any other type of engine E.

More specifically, the present invention is applicable to an engine including a jet pump having a nozzle in a rear of a stern mounted on a small-sized boat, and a crankshaft is spline-coupled to an intermediate shaft which is connected directly to an impeller shaft or through a damper. In addition, the present invention is applicable to an engine which is connected to a power generator having a coil mounted on one of a rotor and a stator to constitute a generator motor, and a shaft of the rotor and the crankshaft are spline-coupled to each other. Further, the present invention is also applicable to an engine working machine and a pump in other fields, wherein wide general-purpose properties are exhibited by the consideration of the vibration and by a reduction in size of the spline piece.

Additionally, the present invention is applicable to an engine including cylinders disposed in a V-shaped arrangement within a single cylinder block, and also to any of a 2-cycle engine and a 4-cycle engine.

What is claimed:

1. An engine having a crankshaft and a system for outputting power from the crankshaft, comprising:

said crankshaft having an end formed with an internal hole;

a flywheel;

a spline piece, wherein said flywheel and said spline piece are coaxially coupled to said end of said crankshaft to permit power to be output through the spline piece, wherein a first side of said flywheel is fitted to an outer periphery of said end of said crankshaft, and said spline piece has a flange portion which is superposed on a second side of said flywheel, said spline piece being fitted to an inner peripheral surface of said flywheel and said spline piece having a spline-coupling portion which extends from said flange portion toward said crankshaft and said spline-coupling portion is accommodated in said internal hole that opens into said end of said crankshaft; and at least one bolt penetrating through and commonly fastening said flange portion of said spline piece and said flywheel to said end of said crankshaft.

2. An engine according to claim 1, further comprising a case for housing the engine therein, wherein said flywheel and said spline piece are accommodated within said case.

* * * * *